3,441,455
ENCAPSULATED PROPELLANTS AND METHOD FOR THEIR PREPARATION FROM FLUORINATED MONOMERS USING RADIATION
Warren W. Woods and D'Arcy A. Shock, Ponca City, Okla., assignors to Continental Oil Company, Ponca City, Okla., a corporation of Delaware
No Drawing. Filed Jan. 13, 1961, Ser. No. 82,643
Int. Cl. C06b 15/00
U.S. Cl. 149—8                              19 Claims This invention relates to encapsulated propellant components and method for their preparation. In one aspect, it relates to encapsulated fuel components and in another aspect, to cast propellants comprising fuel and oxidizer components dispersed in a polymeric binder.

As used herein, the term "encapsulated propellant component" refers to individual propellant components having a coating of polymer material and admixtures thereof.

As used herein, the term "cast propellants" refers to admixtures of propellant components which are held together by a solid mass of polymeric binder material. The propellant components can be encapsulated or not, prior to the casting operation.

Most current solid propellants consist of physical admixtures of (1) light metals or their hydrides, (2) oxidizers such as lithium or ammonium perchlorate, and (3) a polymeric binder. In many cases, the light metals and metal hydrides are so reactive to air and/or moisture that their practical use requires that they be encapsulated with a non-reactive material. Preferred encapsulating materials are the various polymers which are inert to the light metals and their hydrides. However, many of the polymeric materials cannot be employed by this purpose by virtue of the conditions required for their preparation, e.g., elevated temperatures, presence of moisture, etc. In addition many polymers require a catalyst for their preparation, which catalyst may be undesirable in the final propellant product.

In the case of cast propellants, limitations also are imposed on the binders which can be employed in view of the specific properties which are desired in said binders. The polymerized fluorocarbons (particularly those of a rubbery nature) by virtue of their density, resistance to thermal change, chemical inertness, and low molecular weight of combustion products find particular value as binders for cast propellants.

However, such fluoropolymers, when utilized as binders have a major disadvantage in that their desirably high melting point precludes casting the propellant in molten form. Extrusion or compression forming is disadvantageous because of a tendency toward cracks, voids, or other imperfections in the completed grain. The usual technique is to dissolve the polymer in a suitable solvent (e.g., dioxane), mix in the other ingredients, remove as much solvent as practicable, and then press the wet mass into shape. This is laborious, and not conductive to uniform crack-free grains after drying.

An alternate solution in existing art is to mix the variout ingredients with fluorinated monomers plus polymerization catalysts (e.g., benzoyl or tertiary butyl peroxides) and heat to cause polymerization in situ. Unfortunately, this procedure usually requires heating at 50° C. or higher over a period of several days. Furthermore, the final product necessarily contains residual catalyst which adversely affects storage stability.

It is an objective of this invention to provide improved encapsulated propellant components and cast propellant components and cast propellants, and methods for their preparation.

It is another object of this invention to provide a method for reducing the time and temperature required to encapsulate propellant components and prepare cast propellants.

Still another object of this invention is to provide improved method for encapsulating propellant components in polymeric materials.

Yet another object of this invention is to provide improved encapsulated propellant components and cast propellants and method for their preparation, utilizing gamma radiation.

The foregoing objects are achieved broadly by providing at least one solid propellant component encapsulated in a solid polymeric material, said encapsulated material being prepared by exposing an admixture of said propellant component and at least one radiation reactive nonsolid polymerizable compound to gamma radiation.

In one aspect of the invention, the solid propellant component is a metallic fuel component.

In another aspect of the invention, the metallic fuel component of a propellant is encapsulated in a polymeric material by subjecting said fuel component, in a finely sub-divided fluidized state, to contact with at least one radiation reactive gaseous polymerizable compound in the presence of gamma radiation.

In still another aspect of the invention, cast propellants are prepared by admixing solid propellant components with a viscous radiation reactive material, and at least one radiation reactive non-viscous liquid polymerizable fluorinated compound, and thereafter subjecting said admixture to gamma radiation.

As stated previously, the majority of the current solid propellants comprise physical admixtures of a fuel component, an oxidizer, and a polymeric binder. The fuel components ordinarily are selected from the metals and metal hydrides, and, particularly, the light metals and metal hydrides. Examples of specific suitable fuel components include materials such as lithium, lithium aluminum hydride, beryllium, aluminum hydride, beryllium hydride, aluminum, magnesium aluminum hydride, magnesium hydride, magnesium, lithium borohydride, sodium borohydride, titanium, titanium hydride, lithium hydride, zirconium, zirconium hydride, magnesium borohydride, calcium hydride, $H_2AlCH_2AlH_2$, and $H_2AlC\equiv CAlH_2$. Performance considerations favor the use of lighter metals, light metal hydrides, mixed hydrides, including aluminum alkyl and alkenyl hydrides and the various metal borohydrides.

The oxidizers can include any of the well-known oxidizing agents, but are ordinarily selected from the light metal salts or the salts of ammonia. Specific oxidizers which are ordinarily employed include materials such as ammonium perchlorate, lithium perchlorate, ammonium nitrate, potassium perchlorate, lithium nitrate, sodium perchlorate, and the like.

The materials employed for encapsulation of the individual propellant, e.g., fuel components, in the method of this invention are polymeric in nature and are prepared through the utilization of one or more radiation reactive non-solid compounds. These compounds include broadly single gaseous or liquid monomers which are known to be polymerizable and are conventionally utilized in the preparation of polymers; for example, aliphatic mono-olefins, aryl- and alkarylvinyl compounds, diolefins, and the like. For example, diolefins which can be used include butadiene-1,3,-isoprene, pentene-1, 2,3,-dimethylbutadiene-1,3, 2,3-dimethylpentadiene-1,3, 3,4-dimethylpentadiene-1,3, 2,4-dimethylpentadiene-1,3, 2-neopentylbutadiene-1,3, 2,3,4,-trimethylpentadiene-1,3, hexadiene-1,3, 2-ethylbutadiene-1,3, 2-phenylbutadiene-1,3, 2,3-diphenylbutadiene-1,3, cyclopentadiene-1,3, dicyclopentadiene, cyclohexadiene-1,3, cycloheptadiene-1,3, dimethyl toluene and other polymerizable methyl-, ethyl, propyl-, isopropyl-substituted butadiene - 1,3's, pentadiene - 1,3's, hexadiene-1,3's, and hexadiene-2,4's. The preferred dienes are the 1,3-dienes and those having 4 to 8 carbon atoms.

The vinyls which can be used include the aryl and the alkaryl substituted olefins such as styrene, the vinyl toluenes, alpha-methyl styrene, the alpha-methyl-vinyl toluenes, the ethyl-, propyl-, isopropyl-, butyl- and isobutyl- mono and poly substituted styrenes and alpha-methyl styrenes which can broadly be referred to as the alkyl vinyl benzenes, the vinyl biphenyls, the vinyl naphthalenes, allyl benzene, allyl toluene, allyl naphthalene, stilbene, methyl stilbenes, indene, 2,2-diphenyl ethylene, tri-phenyl ethylene, the phenyl substituted propylenes and butylenes.

In adidtion to the aryl substituted olefins there can be used halogenated aryl substituted olefins such as the mono-, di-, tri-, and tetra-, chloro-, and bromo substituted aryl, and alkaryl olefins such as styrene, the vinyl toluenes, the various vinyl ethyl, propyl, isopropyl, benzenes and naphthalenes.

Preferred aryl alpha-olefins are those having 2 to 6 carbon atoms in addition to the aryl or alkyl aryl group and the alkyl of the alkylaryl group is preferably from 1 to 4 carbon atoms.

The olefins which can be used include ethylene, propylene, butene-1, isobutylene, pentene-1, the isopentene, hexene-1, the isohexenes, heptene-1, the isoheptenes, octene-1, the isooctenes and the various methyl-, ethyl-, propyl-, isopropyl-, butyl-, and isobutyl-substituted 4 to 6 carbon alpha-olefins of these as for instance 3-methyl butene-1, 3,3-dimethyl butene-1, 2,3,3-trimethyl butene-1, 2,3-dimethylbutene-1, 2,4,4-trimethyl pentene-1, and certain of the 2-olefins such as butene-2 and 2-methyl-butene-2 and the like. The preferred olefins are the alpha-olefins having 2 to 6 carbon atoms.

Halogenated olefins which may be used are, preferably, the chloro and in some instances the bromo-substituted olefins; the halogen may substitute mono-, di-, tri- or tetra-, substituted that is partially or completely displace, the hydrogen of the olefins heretofore cited. Preferred halogenated alpha-olefins are from 2 to 6 carbon atoms.

Further, the acetylenes and especially the low molecular weight polymers of acetylene such as the dimers, trimers, and tetramers of acetylene with or without the inclusion of other olefins (e.g., ethylene to the butylenes) in such polymerization and the partial hydrogenated products of such acetylene low molecular weight polymers and copolymers can be employed in the reactions contemplated herein.

The halocarbon and halo-hydrocarbon compounds can also be used and include such chlorine containing compounds as vinyl chloride, and vinylidene chloride, trichloroethylene, tetrachloroethylene and the like; the halo-, substituted vinyl aromatic and vinylidene aromatic monomers such as dichlorostyrene; the chloro- substituted vinyl alkyl benzenes such as vinyl-chlorotoluene; the chloro-substituted alpha-methyl styrenes in which the substitution is either in the alkyl or aromatic group, such as alpha-methyl-chlorostyrene.

Vinyl and allyl esters of mono- and dicarboxylic acids both saturated and unsaturated can be used such as vinyl acetate, vinvyl propionate, vinyl butyrate, and the like; unsaturated alcohols like allyl alcohol; also the polyalkene aryl compounds and derivatives including the polyvinyl-, polyvinylidene- and poly-allyl aryl compounds, such as divinyl benzene, tri-vinyl benzene, divinyl toluene, tri-vinyl toluene, divinyl xylene, divinyl ethyl benzene, divinyl biphenyl and divinyl biphenyl oxide, divinyl naphthalenes, divinyl methylnaphthalenes and derivatives of these; the alkeneacetylenes such as vinylacetylene, α-methyl vinyl-acetylene and the like; and other compounds containing a plurality of vinyl, vinylidene, allyl, alkaryl and other unsaturated double and triple bond.

Further the polymerizable compounds include the poly unsaturated esters of olefinic alcohols and unsaturated monocarboxylic acids such as vinyl acrylate, allyl acrylate, the vinyl and allyl esters of α and β substituted acrylates such as vinyl methacrylate, vinyl crotonate, vinyl ethacrylate, allyl methacrylate, allyl ethacrylate, vinyl α-chloro-acrylate, allyl α-hydroxy ethyl acrylate, and the like; also the saturated esters of monocarboxylic acids such as methyl acrylate, ethyl acrylate, methyl methacrylate, ethyl ethacrylate; and also aromatics such as benzene, naphthalene and the like; alkyl aromatics such as xylene, toluene, ethylbenzene, propylbenzene and the like.

Also included in the radiation reactive compounds which are employed in the encapsulation of individual propellant components are the unsaturated fluoride compounds including olefinic fluorides such as hexafluoro-propene, vinyl fluoride, vinylidene fluoride, fluoroprene, trifluoroethylene, tetrafluoroethylene and other fluorine substituted compounds of aliphatic olefins such as ethylene, propylene, butene-1, isobutylene, pentene-1, isopentene, hexene-1, isohexene, heptene-1, isoheptene, octene-1, isooctene, and various methyl-, ethyl-, propyl-, butyl- and isobutyl- isopropyl substituted 4 to 6 carbon alpha-olefins, as for example, 3-methyl butene-1, 3,3-di-methyl-butene-1; 2,3,3-trimethylbutene-1, 2,3-dimethylbutene-1, 2,4,4-trimethylpentene-1 and two olefins such as butene-2, 2-methylbutene-2, and the like, the preferred olefins being the alpha-olefins having 2 to 6 carbon atoms; fluorine substituted compounds of aryl and alkaryl vinyls such as styrene, vinyl toluene, alpha-methyl styrene, alpha-methyl vinyl toluene, the ethyl-propyl-isopropyl-butyl- and isobutyl- mono and poly substituted styrenes, alkyl vinyl benzenes, vinyl biphenyls, vinyl naphthalenes, allyl benzenes, allyl toluene; also, compounds such as tetrafluoro-allene, 1,1-dihydroperfluorobutadiene, 1,1-difluoro-2,2-di-methylethylene and the like. In addition, the fluoride compounds can contain oxidizing groups such as perchloryl groups whereby the binders prepared therefrom can function also in part as oxidizers.

The preferred fluorides are those containing olefinic and vinyl unsaturation, particularly vinyl fluoride, vinylidene fluoride, hexafluoropropene and the like; the fluoride compounds can contain, in addition to fluorine, other substituents, for example, other halogens and can include such compounds as chlorotrifluoroethylene, dichlorodifluoro-methane, and the like.

The radiation reactive compounds employed in preparing the encapsulated propellant components of this invention also include combinations of one or more organic fluoride compounds, including aliphatic fluorides, with at least one unsaturated compound; i.e., at least one compound selected from those previously listed. As is apparent from the compounds hereinbefore set forth, the unsaturated organic compound can be either fluorinated or non-fluorinated.

Specific reaction systems containing the fluoride compound and the unsaturated organic compound include carbon tetrafluoride and ethylene; vinyl fluoride and vinyl acetate; vinyl fluoride and vinyl chloride; monochlorotrifluoroethylene and propylene; vinyl fluoride and vinylidene fluoride; vinyl fluoride and allyl alcohol; vinylidene fluoride and vinyl acetate; hexafluoropropene and vinyl acetate; vinyl fluoride and vinyl propionate; vinyl fluoride and vinyl butyrate; chlorotrifluoroethylene and ethylene; vinylidene fluoride and vinyl propionate; dichlorodifluoromethane and ethylene; fluoroform and ethylene; and the like.

The invention also includes employment in the encapsulation reaction system of a third or even greater number of components, such as a second organic unsaturated compound. The third component can also be an additional fluoride. Specific examples of 3-component systems which can be reacted to provide suitable binders include vinyl fluoride, vinylidene fluoride and chlorotrifluoroethylene; chlorotrifluoroethylene, ethylene and propylene; monochlorotrifluoroethylene, vinylidene fluoride and hexafluoropropene; and the like.

Mixtures are often desirable to facilitate polymerization under the influence of gamma radiation. For instance, as will be shown by the following examples, ethylene alone is difficult to polymerize. Admixed with either $CF_4$ or small amounts of preformed polyethylene, however, it readily polymerizes under gamma irradiation.

As previously pointed out, the invention in one aspect relates to the preparation of cast propellants in which fluorinated polymers are employed as the binder material. These binder materials include broadly any of the radiation reactive unsaturated fluoride compounds previously described; also combinations of one or more organic fluoride compounds, including aliphatic fluorides, with at least one unsaturated compound, i.e., at least one compound selected from those previously described. Again the unsaturated organic compound can be either fluorinated or nonfluorinated. The binder reaction system can also include a third or even greater number of components, such as a second organic unsaturated compound, e.g., an additional fluoride. Any of the specific radiation reactive compounds or systems previously described, which contain at least one fluorinated compound, can be employed in the preparation of cast propellants.

Gamma radiation is utilized for carrying out the invention. The reaction conditions employed can vary widely depending on the particular reactants used and on the properties desired in the final reaction products. Usually the reaction is carried out at ordinary room temperatures, however, temperatures varying from as low as minus 200° C. to as high as 200° C. can be employed if desired. Preferably, the temperature ranges from about 0 to 50° C. The reaction pressure can also vary widely. When one or more of the reactants is a gas, the pressure is usually established by the limitations of the equipment employed and when liquid reactants are used, the pressure is the vapor pressure at the particular temperature of the reaction system. In general, pressures from sub-atmospheric to as high as 1,500 p.s.i. or higher can be used. The reaction time can also vary widely; e.g., from a few minutes to as long as several hours, or even days, depending on the particular reactants employed and the intensity of the gamma radiation. Usually, however, the formation of the solid binder can be effected in a matter of a few hours and not more than a few days. The radiation intensity can vary over a wide range, usually from about $1 \times 10^3$ to about $1 \times 10^7$ reps per hour, more preferably from about $1 \times 10^4$ to about $1 \times 10^6$ reps per hour. The total radiation dosage usually varies from between about $1 \times 10^3$ to about $1 \times 10^9$ reps and more preferably from about $1 \times 10^4$ to about $1 \times 10^8$ reps. The ratios of the various components used in encapsulation of propellant components and castings of propellants can be varied to provide polymers having a gradation of specific properties, and can be adjusted to provide materials having a wide range of properties, as desired, for particular applications. Broadly speaking, when utilizing a fluoride compound and an unsaturated compound, the fluoride compound can vary in relation to the unsaturated organic compound over a range of from 1:1,000 to 10:1 on a mole basis.

Various procedures can be employed for carrying out encapsulation. For example, when individual fuel components, or admixtures thereof, are to be encapsulated as individual particles, this process can be effected by wetting the particles with one or more radiation reactive liquid polymerizable compounds and thereafter subjecting the wetted particles to gamma radiation. This operation can be carried out in successive stages to provide any desired thickness of the encapsulating binder material. It is also within the scope of the invention to fluidize finely subdivided propellant component or components, utilizing as a fluidizing medium one or more gaseous radiation reactive polymerizable compounds, and subject the fluidized mass to gamma radiation. If desired, the fluidizing medium can include an inert gas in addition to the polymerizable compound; e.g., to aid in fluidization or reduce the partial pressure of the gaseous polymerizable compound. The conditions which are required for fluidization, i.e., solids particle size, superficial fluidizing gas velocities, etc., are well-known to those skilled in the art and need not be set forth herein.

To provide a cast propellant, which includes the various propellant components such as the fuel component (which may be encapsulated prior to incorporation in the cast propellant), oxidizer material, and the like, it is desirable that the propellant admixture be sufficiently viscous so that the propellant components can be retained in suitable dispersion in the radiation reactive polymerizable compound or compounds during the radiation process. Since many of the radiation reactive compounds previously set forth are relatively non-viscous, even at low temperatures, it is desirable when casting a propellant to incorporate in the propellant component admixture a viscous radiation reactive material, prior to subjecting the admixture to gamma radiation. This material preferably is one which is plastic or a gel-like in nature. Such a material can even be a solid, but must be sufficiently soft so that a good dispersion of the propellant components can be provided therein by conventional mixing procedures. Among the viscous materials which can be employed for this purpose are low molecular weight polyethylene, low molecular weight polystyrene, semi-solid viscous materials such as unsaturated hydrocarbon waxes and fluorinated waxes, low molecular weight fractions of fluoropolymers and organic thickeners commonly used in hydrocarbon systems such as aluminum stearates, naphthenates and the like, methyl methacrylate polymers, vinyl ester polymers, such as polymers of vinyl propionate, vinyl butyrate, etc., silicone polymers, and the like. The viscous radiation reactive material is used in combination with at least one radiation reactive non-viscous liquid polymerizable fluorinated compound. When the viscous radiation reactive material is a fluorinated material the non-viscous liquid polymerizable fluorinated compound can be omitted.

The quantities of the various components employed in preparing the cast propellants can vary widely and will depend upon the particular fuel components, oxidizers, and fluorinated polymeric binders which are used. In the ordinary propellant it is desirable to provide suitable proportions of ingredients such that the maximum reaction is obtained between the various components. For example, in a propellant in which lithium hydride is utilized as the fuel component, and a fluorinated polymer as the binder, it is desirable that reactions take place to provide lithium fluoride and alumina, the oxygen in the alumina coming from the oxidizer material. Thus, in a system employing lithium aluminum hydride, ammonium perchlorate, and a copolymer of vinylidine fluoride and hexafluoropropylene as the binder, the components can vary on a weight percent basis from about 25 to about 40 percent lithium aluminum hydride, from about 25 to about 10 percent binder, and about 50 percent of the oxidizer. Broadly, the ranges of the various components can include from about 10 to about 40 parts by weight or higher of the fuel component, from about 25 to about 65 parts of the oxidizer, and from about 10 to about 40 parts of the binder; again, the particular proportions of composition being based on the components used and the reaction products desired in the consumption of the propellant mass.

The following examples are presented to illustrate specific fluorinated binders and encapsulating polymers which can be utilized in preparing the propellants of this invention. In these examples, G-values were obtained by the following method, illustrated by the reaction of vinyl fluoride and vinyl acetate.

The G-value for polymer based on the reaction of vinyl fluoride and vinyl acetate (see Example 1) is determined as follows:

$$G(VF+VA) = \frac{6.02 \times 10^{23}(23.4)(0.014)(*)}{(5.81 \times 10^{11}(0.72 \times 10^5)(15.5)14.5+13.9)}$$

$$G(VF+VA)=10,600$$

This is a minimum value (since all $C_2H_3F$ reacted) and probably is larger.

(*) The G-value is determined as follows: "G-value" defined as the number of molecules reacted per 100 electron volts of energy absorbed, e.g.

Copolymer system consisting of monomer A and monomer B let $N_A$=number of molecules of A reacted
$N_B$=number of molecules of B reacted $$G(N_A)=\frac{N_A}{100 \text{ e.v. energy absorbed by total reactants}}$$

then $$G(N_A+N_B)=G(N_A)+G(N_B)$$

$$N_A=\frac{W \times \overline{N}_A \times A_V}{M_A}$$

where:

W=total weight of polymer formed
$\overline{N}_A$=weight fraction of monomer A in polymer
$A_V$=Avogadro's number
$M_A$=molecular weight of A The energy absorbed by the system in units of 100 electron volts is:

$$E(100 \text{ e.v.})=\frac{R \text{ (reps)}}{\text{(hr.)}} \times t \text{ (hr.)} \times 93 \left(\frac{\text{ergs}}{\text{g. rep}}\right) \times$$
$$\frac{1}{1.6 \times 10^{-12}} \left(\frac{\text{e.v.}}{\text{ergs}}\right) \times \left[W_A \cdot \frac{\overline{e}_A}{\overline{e}_{H_2O}}+W_B \frac{\overline{e}_B}{\overline{e}_{H_2O}}\right] \times \frac{1}{100}$$

where:

R=Radiation intensity at sample location as measured by Ceric Sulfate dosimetry in units of reps per hour
t=Total irradiation time in hours
$W_A$=Weight of monomer A charged in grams
$W_B$=Weight of monomer B charged in grams
$\overline{e}$=Electron density of A, B or $H_2O$ then $$E(100 \text{ e.v.})=5.81 \times 10^{11} Rt \left(W_A \cdot \frac{\overline{e}_A}{\overline{e}_{H_2O}}+W_B \cdot \frac{\overline{e}_B}{\overline{e}_{H_2O}}\right)$$

thus final expression for $G(W_A)$ becomes:

$$G(W_A)=\frac{6.02 \times 10^{23} W \overline{N}_A}{5.81 \times 10^{11} Rt \left(W_A \cdot \frac{\overline{e}_A}{\overline{e}_{H_2O}}+W_B \cdot \frac{\overline{e}_B}{\overline{e}_{H_2O}}\right) M_A}$$

By a similar procedure the expression for $G(W_B)$ can be derived:

$$G(W_B)=\frac{6.02 \times 10^{23} W \overline{N}_B}{5.81 \times 10^{11} Rt \left(W_A \cdot \frac{\overline{e}_A}{\overline{e}_{H_2O}}+W_B \cdot \frac{\overline{e}_B}{\overline{e}_{H_2O}}\right) M_B}$$

then $G(N_A+N_B)=$ $$\frac{6.02 \times 10^{23} W}{5.81 \times 10^{11} Rt \left(W_A \cdot \frac{\overline{e}_A}{\overline{e}_{H_2O}}+W_B \cdot \frac{\overline{e}_B}{\overline{e}_{H_2O}}\right)} \left[\frac{\overline{N}_A}{M_A}+\frac{\overline{N}_B}{M_B}\right]$$

EXAMPLE 1

A stabilized vinyl acetate was distilled in vacuum and 20 ml. of the distillate collected in a 200 ml. stainless steel reactor. This corresponded to 15 gms. (.17 moles) of vinyl acetate. Then 15 gms. (.33 moles) of vinyl fluoride were added to the reactor. The mixture was degassed by freeze pump technique and placed in the gamma radiation field. The mixture was irradiated at $0.72 \times 10^5$ reps per hour for 15.5 hours. After this, the excess vinyl fluoride was vented, and the weight loss indicated 8.4 gms. (0.18 moles) of vinyl fluoride had reacted. Upon opening the reactor, no liquid vinyl acetate remained. The reactants consumed correspond to a 1:1 copolymer. A fluorine analysis indicated 13.7% fluorine compared to 14.4% theoretical. The melting characteristics were unique, viz, 90° C. (clear, soft); 165–170° (soft, no birefringence); 195–200° (viscous, clear); 230° (decompose, darken). The radiation produced copolymer is insoluble in acetone, cyclohexanone, benzene, xylene, and ethylene dichloride.

EXAMPLE 2

Ethylene was pressured to 600 p.s.i. in a 200 ml. stainless steel bomb. It was then frozen in a liquid nitrogen bath and thoroughly degassed by alternately freezing and thawing the ethylene. A vacuum of 50 microns was used to exhaust the air from the frozen ethylene. Carbon tetrafluoride was pressured to 150 p.s.i. in a similar stainless steel bomb and also degassed by the freeze pump technique. These gases were placed in the same stainless steel bomb and allowed to return to room temperature. Analysis immediately after mixing showed no zero time reaction had occurred. The bomb was then subjected to gamma radiation at various levels of intensity, for various times and the contents analyzed. The results of this study are summarized in the following table:

TABLE I.—IRRADIATION OF ETHYLENE [1] AND CARBON TETRAFLUORIDE [2]

| Volume of Reactants (ml.) | | | | Gamma Dose Rate (reps/hr. ×10⁵) | Total Gamma Dose (reps ×10⁶) | Polymer Formed (grams) | −G(C₂H₄) [3] |
|---|---|---|---|---|---|---|---|
| Ethylene | | CF₄ | | | | | |
| Initial | Final | Initial | Final | | | | |
| 20.0 | 16.5 | 4.5 | 4.5 | 3.3 | 14.6 | 2.02 | 257 |
| 20.0 | 18.5 | | | 3.3 | 15.0 | 0.66 | 82 |
| 20.0 | 18.5 | 4.5 | 4.5 | 2.5 | 12.1 | 0.74 | 114 |
| 20.0 | 18.0 | | | 2.5 | 12.1 | 0.87 | 134 |
| 20.0 | 18.5 | 4.5 | 4.5 | 2.5 | 12.1 | 0.64 | 100 |
| 20.0 | 19.0 | | | 2.5 | 12.1 | 0.57 | 84 |
| 20.2 | 19.0 | 4.5 | 4.5 | 1.0 | 9.0 | 0.80 | 167 |
| 20.0 | 19.0 | | | 1.0 | 9.0 | 0.74 | 153 |

[1] Initial ethylene pressure was 600 p.s.i.g.
[2] Initial carbon tetrafluoride pressure was 150 p.s.i.g.
[3] G-value based on the amount of ethylene consumed.

There was no appreciable change in the volume of carbon tetrafluoride (measured at the temperature of complete liquefaction). In general there is a slight increase of the G-value when the carbon tetrafluoride is present.

The white polymer formed in the presence of carbon tetrafluoride melted from 32 to 101° C. and could be extracted with n-hexane. The original polymer was analyzed and found to have 0.39% fluorine, while the hexane soluble (M.P. 25 to 67° C.) and insoluble (M.P. 70 to 111° C.) fractions were found to contain 0.35% and 0.29% fluorine, respectively.

EXAMPLE 3

A 200 ml. stainless steel reactor was charged with 15.5 gms. (0.25 moles) of vinyl chloride and degassed by freeze pump technique. Then 40.2 gms. (0.88 moles) of vinyl fluoride was added to the reactor and the mixture was further degassed. The reactor was placed in a gamma radiation field at a dose rate of $0.72 \times 10^5$ reps/hr. for 17 hours. At the end of this period the offgas was vented and 17.7 gms. of the polymer remained in the reactor. According to elemental analysis the polymer contained 51.3% chlorine and 2.73% fluorine. If the polymer consists of a 10:1 molar ratio of vinyl chloride to vinyl fluoride, then the theoretical elemental analysis would be 2.7% fluorine and 52.9% chlorine. The theoretical yield of polymer on the basis of a 10:1 ratio is 16.2 gms. Thus it appears that the reaction essentially went to completion, based on the vinyl chloride.

The G-value based on the amount of both monomers consumed is in the order of 30,000. The polymer was insoluble in acids and bases. Cyclohexanone caused the polymer to swell. The polymer was insoluble in acetone and hexane. The melting point range of the polymer was 93 to 145° C.

Example 4

Vinylidene fluoride, vinyl fluoride and chlorotrifluoroethylene monomers were mixed in a 1:1:1 molar ratio in a stainless steel reactor and degassed by freeze pump technique. Then thereactor was placed in a gamma radiation field of $1 \times 10^5$ reps/hr. for 10 hours. At the end of this period, the bomb pressure was essentially atmospheric and analysis of the offgas indicated only traces of monomers remained.

The yield of polymer corresponded to 100% reaction of the monomers.

A halogen analysis found 13.6% Cl and 47.6% F compared to predicted 15.7% Cl and 50.3% F based on a 1:1:1 terpolymer. The melting characteristics were unique in that the material appeared to be still rubbery at 200° C. and no decomposition was observed up to 285° C.

Example 5

A 180 ml. stainless steel reactor was charged with 21 grams (0.50 moles) of propylene and 58 grams (0.50 moles) of monochlorotrifluoroethylene. The reactor was degassed by freeze pump technique and placed in a gamma radiation field of $3 \times 10^5$ reps/hr. for 15 hours. Also, the polymerization took place at the ambient temperature of the pool water ($\sim 25°$ C.) and vapor pressure of the monomers used. At the end of the reaction period, the offgas was vented and the polymer formed corresponded to an 80% product yield based on the monomer charge.

A halogen analysis of the polymer indicated 36.6% F and 19.0% Cl. This can be compared to 36.0% F and 22.4% Cl predicted for a 1:1 copolymer.

The polymer began to melt at 52° C., showed good flow at 72° C., and excellent flow and transparency at 100° C. Upon solidification, no crystallites were formed.

The G-value for the formation of polymer based on the total amount of both monomers charged was about 2,500.

Example 6

A 200 ml. stainless steel reactor was charged with 46 parts of vinyl fluoride and degassed by freeze pump technique. Then 62 parts of vinylidene fluoride was added to the reactor and the mixture was further degassed. The reactor was placed in a gamma radiation field at a dose rate of $0.87 \times 10^5$ reps/hr. for 10 hours. At the end of this period the reactor was opened and 108 parts of a polymeric material was recovered. This polymer was a white, spongy solid.

An elemental analysis indicated 48.0% fluorine compared to a predicted 51.8% fluorine for a 1:1 copolymer. The polymer had a melting softening range of 168 to 200° C. and began to decompose at 235° C.

Since the polymerization reaction went to completion only a minimum G-value can be estimated. Based on the total amount of both monomers consumed, the G-value was about 24,000.

Example 7

A 200 ml. stainless steel reactor was charged with 41 parts of vinyl acetate and degassed by freeze pump technique. Then 31 parts of vinylidene fluoride was added to the reactor and the mixture was further degassed. The reactor was placed in a gamma radiation field at a dose rate of $1.0 \times 10^5$ reps/hr. for 10 hours. At the end of this period, the reactor was opened and 72 parts of a polymeric material was recovered. This polymer was a white solid.

Since the polymerization reaction went to completion only a minimum G-value can be estimated. Based on the total amount of both monomers consumed, the G-value was about 15,400.

Example 8

A 180 ml. stainless steel reactor was charged with 11 grams of ethylene, 30 g. of propylene and 81.5 g. of monochlorotrifluoroethylene. The mixture was degassed by freeze pump technique. The reactor was placed in a gamma field of $1.2 \times 10^5$ reps/hr. for 15 hours. At end of the irradiation period the unreacted monomers (90 g.) were distilled into a second reactor. The original reactor yielded 33 g. of a milky-white, spongy polymer which actually foamed out through the reactor opening. The polymer unexpectedly is very soluble in acetone at room temperature. The acetone solution can be used to cast a transparent, elastic film.

Example 9

A 180 ml. stainless steel bomb was charged with 50 ml. (44 g.) vinyl acetate. The reactor was degassed and 14 grams of hexafluoropropene was added. The mixture was thoroughly degassed by freeze pump technique. The reactor was then placed in a $1.2 \times 10^5$ reps/hr. gamma field for 15 hours.

At the end of the irradiation period, 4 grams of hexafluoropropene and about 54 grams of polymer were recovered. The polymer was a hard, greenish-yellow solid.

On the basis of the polymerization reaction: 0.067 moles of hexafluoropropene reacted with 0.51 moles of vinyl acetate. This indicates about a 1 to 8 hexafluoropropene/vinyl acetate copolymer, and a predicted fluorine analysis of 13.6%. The experimental fluorine analysis yielded 12.5%, in reasonable agreement.

The polymer is completely soluble in acetone and can be solution cast for forming a film.

Example 10

Forty mls. of vinyl propionate were distilled into a 180 ml. stainless steel bomb via vacuum line. To this was added, via the same vacuum line, 20 grams of vinyl fluoride. This mixture was degassed by the freeze pump technique and irradiated at a gamma dose rate of $0.87 \times 10^5$ reps per hour for 15 hours. At the end of this period, the bomb was removed and the solid polymer which formed was drilled out of the bomb.

Analysis:

Percent F—5.9

Monomers reacted in a 1:3 mole ratio, 1 mole vinyl fluoride to 3 moles vinyl propionate. The G-value based on the total amount of both monomers consumed is in the order of 30,000.

Example 11

A 180 ml. stainless steel bomb was charged with 44.3 gm. of vinyl butyrate and 17.8 gms. of vinyl fluoride. The mixture was degassed by freeze pump technique and irradiated in a gamma field of $0.92 \times 10^5$ reps per hours for 10 hours. At the end of this period, 4.0 grams of vinyl fluoride remained unreacted. Thus, 0.3 mole of vinyl fluoride reacted with 0.4 mole of vinyl butyrate.

The polymer was a transparent, rubbery, elastic material.

Example 12

A 180 ml. stainless steel bomb was charged with 29 grams of monochlorotrifluoroethylene and 7 grams of ethylene. The mixture was degassed by freeze pump technique and irradiated in a gamma field of $1.6 \times 10^5$ reps per hour for 14 hours. At the end of this period no vapor pressure remained, indicating complete reaction. Theory predicts a 39% fluorine content for a 1:1 mole ratio polymer, while the experimental value was 42.6%. The polymer had a softening range of 100 to 180° C. A G-value calculated on the total amount of both monomers consumed is about 7,200.

EXAMPLE 13

A 180 ml. stainless steel bomb was charged with 67.7 gms. (0.68 moles) of vinyl propionate and 21.4 gms. (0.33 moles) of vinylidene fluoride. The mixture was degassed by freeze pump technique and irradiated in a gamma field of $1.5 \times 10^5$ reps per hour for 15 hours. At the end of this period 7.3 grams of vinylidene fluoride remained unreacted. Thus 0.22 moles of vinylidene fluoride reacted with 0.67 moles of vinyl propionate. A fluorine analysis indicated 14.7%; this suggests a 1:2 vinylidene fluoride vinyl propionate polymer.

The polymer is a transparent, rubbery material. The polymer softens at 140° C. and no decomposition occurs up to 285° C.

EXAMPLE 14

A 180 ml. stainless steel bomb was charged with 32 grams monochlorotrifluoroethylene, 18.7 grams vinylidene fluoride and 41.3 grams of hexafluoropropene. The mixture was degassed by freeze pump technique and irradiated in a gamma field of $1 \times 10^5$ reps per hour for 46 hours. A yield of 50 grams of a transparent rubbery material resulted. This polymer could be pressed into a sheet. An elemental analysis showed 54.5% fluorine and 16.4% chlorine.

EXAMPLE 15

Several individual olefinic fluorine compounds were subjected to gamma radiation with the results being presented in Table I.

e.v./gm. was given to the sample. After irradiation, the ethylene not polymerized was transferred to a measuring cylinder using a liquid nitrogen trap. The volume of this ethylene was then read. The results of the tests are set forth in the following table:

TABLE

Gamma radiation initiated polymerization of ethylene at 23° C.

TEST SERIES I

| Weight of polymer added (gm.): | G-value (molecules/ 100 e.v.) |
|---|---|
| 0.0 | 190 |
| 1.1 | 250 |
| 6.7 | 450 |
| 9.5 | 980 |
| 13.4 | 1,030 |

TEST SERIES II

| | |
|---|---|
| 0.0 | 150 |
| 2.2 | 240 |
| 10.7 | 770 |
| 14.5 | 1,070 |

TEST SERIES III

| | |
|---|---|
| 0.0 | 120 |
| 2.8 | 210 |
| 11.5 | 705 |

The following example illustrates a commercial application of the invention as directed to a fluidized process for encapsulating individual fuel component particles.

EXAMPLE 17

| | Flow rate |
|---|---|
| Fuel component, $LiAlH_4$ (10° micron size) | Stationary in fluidized bed. |
| Fluidizing medium, ethylene: | |
|   Superficial velocity | 6.3 ft./min. |
|   Average particle residence time | Infinite. |
| Operating conditions: | |
|   Fluidized bed temperature | 70° F. |
|   Fluidized bed pressure | 15 lb. p.s.i.a. |
|   Gamma radiation intensity | $10^5$ reps/hr. |
|   Total residence time | 100 hours. |

TABLE I

| Fluoro Olefin Monomer | Gamma Dose Rate Reps Per Hour | Total Gamma Dose Reps | Product "G" Value | Melting Point Range, °C. | Halogen Content |
|---|---|---|---|---|---|
| Vinylidene fluoride | $3.5 \times 10^5$ | $1.14 \times 10^6$ | 10,800 | 200–240 | 58.5% F |
| Chlorotrifluoroethylene | $0.82 \times 10^5$ | $1.23 \times 10^6$ | 7,190 | 180–210 | 48.7% F  30.0% Cl |
| Hexafluoropropene | $2.2 \times 10^5$ | $4.4 \times 10^6$ | 101 | 100–120 | 71% F |
| Tetrafluoroethylene | $1.0 \times 10^5$ | $1.5 \times 10^6$ | 7,140 | 740–750 | 69.2% F |

EXAMPLE 16

In each of the following tests, ethylene was polymerized in the presence of gamma radiation. In several of the tests, a quantity of polyethylene was introduced into a (120 cc.) Aminco test bomb prior to introduction of the ethylene. The polyethylene used was prepared by exposing ethylene to gamma radiation at 59 atmospheres, 23° C., and at an energy input rate of $1.5 \times 10^{19}$ e.v./gm./hr. Matheson CP grade ethylene was passed over heated copper, then through a potassium hydroxide trap. The resulting ethylene was degassed by freeze pump technique on a vacuum system, and 16 cc. of this ethylene was introduced into the reaction bomb. The irradiation was performed at 23° C. using four fuel elements of Materials Testing Reactor. The field intensity was $1.34 \times 10^{19}$ e.v./gm./hr. and total radiation dosage of $2.92 \times 10^{20}$ The fuel component is suspended in a gas flow of sufficient velocity to fluidize the bed, but not transfer solid. In this case, 100 micron size $LiAlH_4$ is placed in a flow of ethylene maintained at 15 pounds pressure, passing at a velocity of 6.3 ft./min. The temperature of the system is that of the room (70° F.). The fluidized mass is placed in the strong gamma radiation field ($10^5$ reps/hr.) for sufficient time to polymerize a sufficient coating of polymer around the fuel particle; in the case, 100 hours.

EXAMPLE 18

The following example illustrates a commercial application of the invention as directed to the preparation of a cast propellant.

| Propellant components: | Weight percent |
|---|---|
| Aluminum powder | 16 |
| Ammonium perchlorate | 64 |
| Vinylidene fluoride - vinyl fluoride - chlorotrifluoroethylene mixture of 1 mole each | 18 |
| Polystyrene | 2 |

| Operating conditions: | |
|---|---|
| Temperature (ambient room temp.) °F | 70° |
| Pressure, pounds | 500 |
| Time, hours | 12 |
| Gamma radiation intensity, reps/hr. | $10^5$ |

The process followed is to introduced the polymeric material into a pressure bomb maintained above the vapor pressure of these constituents; e.g., vinylidene fluoride, vinyl fluoride, and chlorotrifluoroethylene. To this liquid mixture is added, through a pressurized entry valve, the required amount of low molecular weight polystyrene which is stirred until dispersed and the viscosity reaches approximately 1,000 centipoises. Aluminum powder and ammonium perchlorate (approximately 100 micron size) are then added in the same manner and stirred until completely dispersed. The mass is then forced by gas pressure into the casing for the propellant charge which, in turn, is irradiated in an intense gamma field for a period of 12 hours. The mass is solidified in the propellant case.

Having thus described the invention by providing specific examples thereof, it is to be understood that no undue limitations or restrictions are to be imposed by reason thereof, and that many modifications and variations are within the scope of the invention.

We claim:

1. A method for encapsulating at least one solid propellant component in a solid polymeric material in the absence of a polymerization catalyst or cross-linking agent which comprises subjecting an admixture consisting essentially of a solid propellant fuel component selected from the group consisting of metals, metal hydrides and mixed hydrides with at least one polymerizable monomer selected from the group consisting of gaseous and liquid monomers and further selected from the group consisting of ethylenically unsaturated hydrocarbons and halogen, carboxy and hydroxy derivatives of ethylenically unsaturated hydrocarbons, at least one monomer being a fluorinated monomer, to between about $1 \times 10^3$ and about $1 \times 10^7$ reps per hour of gamma radiation to provide a total dosage of between about $1 \times 10^3$ and about $1 \times 10^9$ reps at a temperature between about $-200°$ C. and about $200°$ C. whereby said monomer is polymerized to solid polymer by gamma radiation.

2. The method of the claim 1 in which the admixture contains an oxidizer.

3. The method of claim 1 in which the polymerizable monomer is ethylene.

4. The method of claim 1 in which the polymerizable monomer is vinylfluoride.

5. The method of claim 1 in which the polymerizable monomers are vinylidene fluoride and hexafluoropropene.

6. The method of claim 1 in which the polymerizable monomers are chlorotrifluoroethylene, vinylfluoride and vinylidene fluoride.

7. Solid propellant component encapsulated in a solid polymer material prepared by the process of claim 1.

8. The method of claim 1 in which the polymerizable monomer is a liquid.

9. The process of claim 8 in which the polymerization is carried out at room temperature.

10. The method of claim 1 in which the polymerizable monomer is in the gaseous state and the fuel component is encapsulated in the fluidized state by contact with said monomer.

11. The process of claim 10 in which the polymerization is carried out at room temperature.

12. A method for casting propellants in the absence of a polymerization catalyst or cross-linking agent which comprises admixing materials consisting essentially of a solid propellant fuel component selected from the group consisting of metals, metal hydrides and mixed hydrides with a viscous polymerizable monomer and at least one polymerizable non-viscous liquid fluorinated monomer, said fluorinated monomer being further defined as selected from the group consisting of ethylenically unsaturated hydrocarbons, halogen derivatives of ethylenically unsaturated hydrocarbons and ethylenically unsaturated hydrocarbons containing oxidizing groups, introducing said admixture to a zone of predetermined shape and thereafter subjecting said admixture to between about $1 \times 10^3$ and about $1 \times 10^7$ reps per hour of gamma radiation to provide a total dosage of between about $1 \times 10^3$ and about $1 \times 10^9$ reps whereby said admixture is polymerized to a solid mass by gamma radiation.

13. The method of claim 12 in which the mixture contains an oxidizer.

14. The process of claim 12 in which the polymerization is carried out at room temperature.

15. Propellant cast in a solid polymeric binder material prepared by the process of claim 12.

16. A method for casting propellants in the absence of a polymerization catalyst or cross-linking agent which comprises admixing materials consisting essentially of a solid propellant fuel component selected from the group consisting of metals, metal hydrides and mixed hydrides with a polymerizable viscous fluorinated monomer, said monomer being further defined as selected from the group consisting of ethylenically unsaturated hydrocarbons, halogen derivatives of ethylenically unsaturated hydrocarbons and ethylenically unsaturated hydrocarbons containing oxidizing groups, introducing said admixture to a zone of predetermined shape and thereafter subjecting said admixture to between about $1 \times 10^3$ and about $1 \times 10^7$ reps per hour of gamma radiation to provide a total dosage of between about $1 \times 10^3$ and about $1 \times 10^9$ reps whereby said admixture is polymerized to a solid mass by gamma radiation.

17. The method of claim 16 in which the admixture contains an oxidizer.

18. The process of claim 16 in which the polymerization is carried out at room temperature.

19. Propellant cast in a solid polymeric binder material prepared by the process of claim 16.

References Cited

UNITED STATES PATENTS

| | | | |
|---|---|---|---|
| 2,877,504 | 3/1959 | Fox. | |
| 2,970,898 | 2/1961 | Fox | 52—0.5 |
| 3,017,260 | 1/1962 | Arquette et al. | 149—60 |
| 3,003,310 | 10/1961 | D'Alelio | 149—60 |
| 3,070,470 | 12/1962 | Argabright et al. | 149—61 X |
| 3,071,923 | 1/1963 | D'Alelio | 60—35.4 |
| 3,145,528 | 8/1964 | D'Alelio | 149—19 |

OTHER REFERENCES

Farber, Astronautics, vol. 5, No. 8, August 1960, pp. 34, 40 and 42.

Radiation Chemistry for Industry, Conklin et al., Radiation Chemistry Associates, Harvard Business School (1955), pp. 2, 6, 9 to 16, 62 and 63.

BENJAMIN R. PADGETT, *Primary Examiner.*

U.S. Cl. X.R.

264—3; 149—19, 20, 87, 7